US011237074B2

(12) United States Patent
Petersen

(10) Patent No.: US 11,237,074 B2
(45) Date of Patent: Feb. 1, 2022

(54) AEROSOL DISTRIBUTION IN FILTER TESTING SYSTEMS

(71) Applicant: Camfil AB, Stockholm (SE)

(72) Inventor: Sven Petersen, Järna (SE)

(73) Assignee: Camfil AB, Stockholm (SE)

(*) Notice: Subject to any disclaimer, the term of this patent is extended or adjusted under 35 U.S.C. 154(b) by 0 days.

(21) Appl. No.: 16/817,348

(22) Filed: Mar. 12, 2020

(65) Prior Publication Data

US 2020/0292405 A1 Sep. 17, 2020

(30) Foreign Application Priority Data

Mar. 14, 2019 (SE) .................................... 1950324-2

(51) Int. Cl.
| | |
|---|---|
| *G01M 3/20* | (2006.01) |
| *G01N 15/08* | (2006.01) |
| *B05B 1/14* | (2006.01) |

(52) U.S. Cl.
CPC .............. *G01M 3/20* (2013.01); *G01N 15/08* (2013.01); *G01N 2015/084* (2013.01)

(58) Field of Classification Search
CPC .......... G01M 3/00; G01M 3/20; G01N 15/00; G01N 15/08; G01N 15/084; B01D 46/00–54; B05B 1/14
See application file for complete search history.

(56) References Cited

U.S. PATENT DOCUMENTS

| | | | | |
|---|---|---|---|---|
| 8,549,895 | B2 * | 10/2013 | Chung | ................... B01D 46/46 73/40.7 |
| 2006/0042359 | A1 * | 3/2006 | Morse | ................ G01M 3/3281 73/40 |

(Continued)

FOREIGN PATENT DOCUMENTS

| | | |
|---|---|---|
| CA | 2478306 A1 | 5/2000 |
| DE | 102013002413 A1 | 8/2014 |

(Continued)

OTHER PUBLICATIONS

European Search Report for Patent Application No. 20162726.2 dated Jul. 21, 2020.

(Continued)

*Primary Examiner* — Nguyen Q. Ha
(74) *Attorney, Agent, or Firm* — Patterson + Sheridan, LLP

(57) ABSTRACT

An aerosol distributor and an arrangement for filter leakage detection in a gas filtration system comprising such aerosol distributor, the aerosol distributor being configured to be positioned in a gas stream upstream of a filter, said aerosol distributor comprising: a hollow housing having at least one aerosol inlet for admitting an aerosol from an aerosol source into a chamber inside said housing, and a plurality of aerosol outlet holes for releasing the aerosol from the chamber into a gas stream surrounding the housing, wherein said housing has a plate like shape having an upstream surface configured to face an incoming gas stream and a downstream surface configured to face a filter, wherein said housing comprises a plurality of channels extending between channel inlets at the upstream surface and channel outlets at the downstream surface of the housing, such that gas from the gas stream can pass through the housing.

19 Claims, 6 Drawing Sheets

(56) References Cited

U.S. PATENT DOCUMENTS

| | | |
|---|---|---|
| 2011/0023428 A1 | 2/2011 | Ziebold et al. |
| 2014/0053634 A1 | 2/2014 | Woolard et al. |
| 2016/0097706 A1* | 4/2016 | Woolard ................ G01M 3/20 73/23.21 |
| 2018/0052092 A1 | 2/2018 | Trombetta et al. |
| 2020/0289971 A1* | 9/2020 | Mahler .................... B05B 1/20 |
| 2020/0391233 A1* | 12/2020 | Woolard ................ G01M 3/20 |

FOREIGN PATENT DOCUMENTS

| | | | |
|---|---|---|---|
| EP | 2090350 A2 | 8/2009 | |
| EP | 2191882 A2 | 6/2010 | |
| EP | 2196250 A2 | 6/2010 | |
| EP | 2226110 A1 | 9/2010 | |
| JP | 10296025 A * | 11/1998 | ............. B01D 46/00 |
| JP | 2002243626 A * | 8/2002 | ............. G01N 15/08 |
| WO | 2007021333 A2 | 2/2007 | |

OTHER PUBLICATIONS

Swedish Search Report for Patent Application No. 1950324-2 dated Sep. 30, 2019.

* cited by examiner

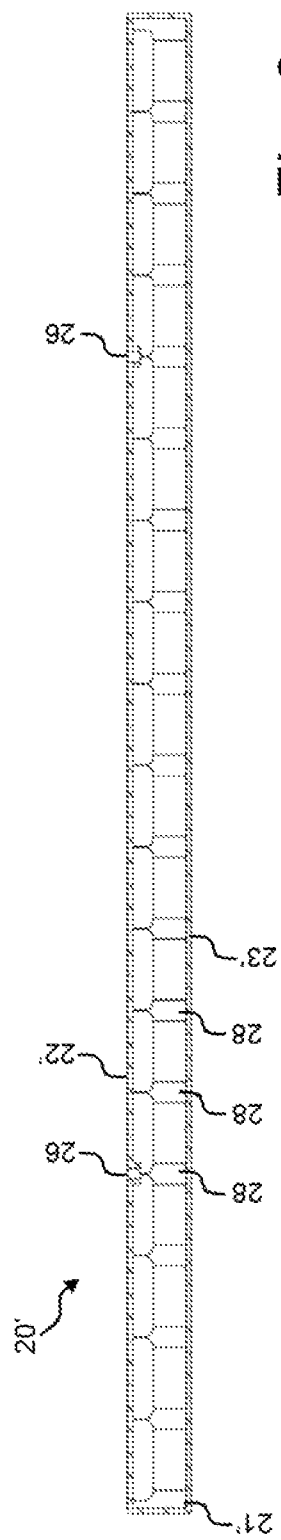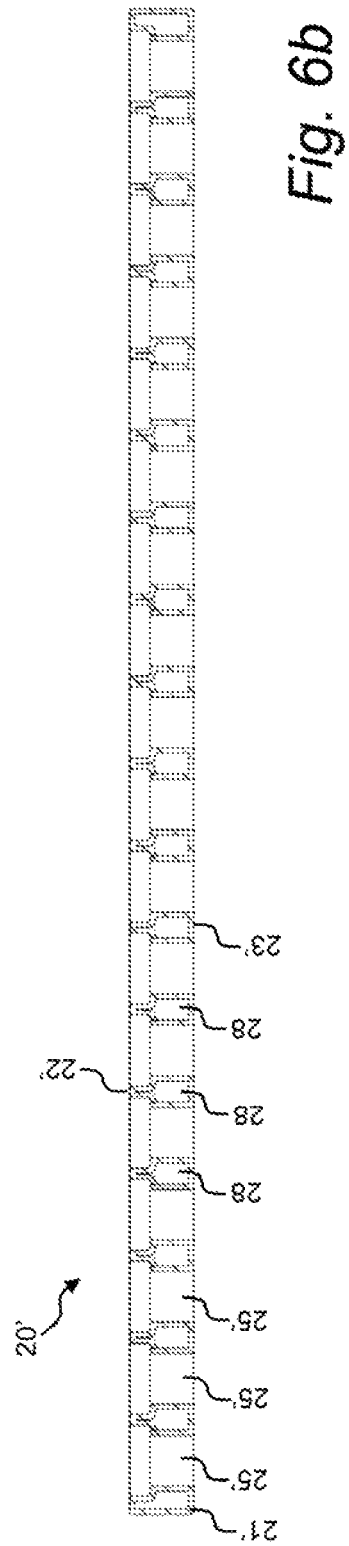

AEROSOL DISTRIBUTION IN FILTER TESTING SYSTEMS

CROSS-REFERENCE TO RELATED APPLICATIONS

This application claims benefit of Swedish patent application No. 1950324-2, filed on 14 Mar. 2019, of which is incorporated by reference in its entirety.

FIELD OF THE INVENTION

The present invention relates generally to arrangements for filter leakage detection in gas filtration systems, and more specifically to aerosol distributors for achieving an even distribution of a test aerosol in the gas stream upstream of the filter to be tested.

BACKGROUND OF THE INVENTION

In some environments where undesired substances are removed from a gas, such as air, by filtering the gas, it is important to be able to check in situ that the filter is working and detect any leakage of the filter. One way of checking the filter is to use a filter testing system, wherein a particulate test substance, typically an aerosol, is injected into the gas stream upstream of the filter, and gas is collected downstream of the filter using a sampling probe. The collected gas is then analyzed with respect to occurrence of the undesired substance.

Testing of filters and filter installations for removal of particles from a gas can for example utilize a monodisperse or polydisperse aerosol of an oil, e.g. dioctyl phthalate (DOP), di-ethyl-hexyl-sebacat (DENS) DENS or poly alpha olefins (PAO). Other typical aerosols used are an aerosol of solid particles of e.g. salt or silica, an aerosol of a polystyrene latex, or an aerosol of viable or non-viable cells. For the testing of molecular filters, gaseous challenge compounds, e.g. toluene or butane in air may also be used. The aerosol is introduced into the gas stream at a point in the duct far enough upstream of the filter or filter bank to assure complete dispersion by the time it reaches the filter or bank of filters.

An upstream sampling probe is often provided immediately upstream of the filter to determine the concentration of the aerosol in the duct, and a downstream sampling probe is provided to detect filter leakage. During testing, a portion of the gas stream is withdrawn from the duct through the sampling probes and conveyed to an external instrument, such as a photometer or a particle counter or the like, which is used to determine the aerosol concentration in both the upstream and downstream samples.

The downstream sampling probe may be movable in a plane parallel to the filter surface, such that the filter surface can be scanned using the sampling probe. This type of scanning sampling probe allows detection of not only the existence of a leak, but can also give rough indication as to the position of the leak on the filter surface. A typical sampling probe is made of a tube with several inlet holes through the tube wall distributed along the length of the sampling probe, and a central outlet.

In order for the leak detection to be accurate, it is important that the aerosol particles are evenly distributed in the gas flow when it reaches the filter so that the aerosol particle load is evenly distributed across the filter area. If the filter is subjected to an uneven particle distribution, e.g. a higher particle concentration towards the middle of the filter and a lower concentration towards the filter edges, this may cause a lower sensitivity to leaks at the edges of the filter compared to leaks positioned closer to the middle of the filter.

If the test aerosol is injected into the gas stream via a single injection point, the injection point must be positioned sufficiently far from the filter to allow the aerosol particles to become evenly distributed before they reach the filter surface. This may drastically increase the space requirements of the filter testing system. In installations where multiple filters are employed in series, the space requirements for introducing the test substance, and withdrawing the samples, are multiplied since the filters must be separated by a distance sufficient to allow proper particle distribution.

Generally, for the aerosol to be completely mixed with the surrounding airflow, the aerosol should be introduced into the airflow at a point that is upstream of the location where it needs to be completely mixed by at least 10 cross-sectional dimensions of the duct through which the airflow is traveling. However, such dimensional requirements can result in a test section that is significantly longer than a conventional filter arrangement, which accordingly undesirably requires a larger foot print along with increased material costs. Alternatively, baffles or other mixing elements may be disposed between the aerosol injection point and the filter to provide adequate mixing over a shorter length. However, the addition of mixing elements significantly restricts the airflow through the filter arrangement. Thus, a larger fan, blower, or the like must be used, which also uses more power to achieve a desired airflow, than if such elements were not present. The larger fan increases equipment cost, while the increased airflow resistance consumes more energy, making the system more expensive to operate.

While the aerosol distributor should provide a uniform particle distribution, it is also important that the contribution of the aerosol distributor to the overall pressure drop over the filter testing system is as low as possible.

A common prior art solution for improving aerosol particle distribution in filter testing systems includes an arrangement of interconnected perforated tubes connected to an aerosol source. Aerosol from the aerosol source is fed to the tubes and distributed into the gas stream via the perforations. However, this type of arrangement typically does not result in a satisfactory distribution, since a higher amount of particle will pass though the perforations closest to the aerosol source and a lower amount of particles will pass though the perforations further away from the aerosol source.

An alternative solution for aerosol distribution in filter testing systems would therefore be desirable, which combines the properties of efficient aerosol particle distribution allowing the aerosol distributor to be placed close to the filter surface, with a low pressure drop.

SUMMARY OF THE INVENTION

One object of the present disclosure is to provide an aerosol distributor for use in a filter testing system, which alleviates at least some of the problems associated with prior art aerosol distributors.

Another object of the present disclosure is to provide an aerosol distributor which combines the properties of efficient aerosol particle distribution allowing the aerosol distributor to be placed close to the filter surface, with a low pressure drop.

The above objects as well as other objects that will become apparent to the skilled person in the light of the present disclosure are achieved by the various aspects of the invention as set out herein.

According to a first aspect of the disclosure, there is provided an aerosol distributor for filter leakage detection in a gas filtration system, said aerosol distributor being configured to be positioned in a gas stream upstream of a filter, said aerosol distributor comprising:

a hollow housing having at least one aerosol inlet for admitting an aerosol from an aerosol source into a chamber inside said housing; and a plurality of aerosol outlet holes for releasing the aerosol from the chamber into a gas stream surrounding the housing, wherein said housing has a plate like shape having an upstream surface configured to face an incoming gas stream and a downstream surface configured to face a filter, wherein said housing comprises a plurality of channels extending between channel inlets at the upstream surface and channel outlets at the downstream surface of the housing, such that gas from the gas stream can pass through the housing.

The aerosol distributor can be permanently mounted upstream of a filter in a filter housing where the filter integrity need to be tested regularly or occasionally. The aerosol distributor function is to distribute an aerosol, e.g. in the form of a carrier stream containing a very fine aerosol of oil particles through a number of small outlet holes into the gas flow upstream of the filter. The aerosol may for example be a monodisperse or polydisperse aerosol of an oil, e.g. dioctyl phthalate (DOP), di-ethyl-hexyl-sebacat (DENS) DENS or poly alpha olefins (PAO). Other examples of aerosols that may be used include an aerosol of solid particles of e.g. salt or silica, an aerosol of a polystyrene latex, or an aerosol of viable or non-viable cells. For the testing of molecular filters, gaseous challenge compounds, e.g. toluene or butane in air may also be used. Downstream of the filter, an aerosol sampling probe is typically used to detect filter leakage. In order for the leak detection to be accurate, it is important that the aerosol particles are evenly distributed in the gas flow when it reaches the filter so that the aerosol particle load is evenly distributed across the filter area.

The inventive aerosol distributor is intended to be mounted in the filter housing or duct upstream of the filter and sized such that gas passing through the filter housing or duct towards the filter must also pass through the channels of the aerosol distributor.

The inventive aerosol distributor is configured to inject the aerosol into the gas stream in a countercurrent manner. The aerosol injected into the gas steam will subsequently travel with, and become mixed with, the gas stream as it passes through the channels extending between upstream surface and the downstream surface of the housing. The combination of the countercurrent injection and the mixing of the gas and aerosol in the channels provides for a very efficient aerosol distribution. This has been found to make it possible to place the aerosol distributor very close to the filter surface, which in turn allows for a reduction of the build depth and reduced size of the filter testing arrangement. Generally, the inventive aerosol distributor may be placed at a distance in the range of 50-250 mm from the upstream surface of the filter. This can be compared to a corresponding prior art gas distributor which requires a distance of at least 400 mm.

The inventive aerosol distributor has been found to reduce the particle distribution deviation across the filter area to less than 15%, which can be compared to about 30% with a corresponding prior art gas distributor.

Surprisingly, it has been found that with the inventive aerosol distributor a particle distribution deviation across the filter area of less than 15% can be achieved with a building depth as low as 70 mm (including the aerosol distributor thickness and the distance between the aerosol distributor and the filter).

While the aerosol distributor should provide a uniform particle distribution, it is also important that the contribution of the aerosol distributor to the overall pressure drop over the filter testing system is as low as possible. The housing should therefore preferably be designed for minimum airflow resistance. It has been found that with the inventive aerosol distributor, a significant improvement of the aerosol distribution can be with a very low contribution to the overall pressure drop.

With a suitable size and number channels through the plate like housing, the additional pressure drop caused by the aerosol distributor can be reduced significantly compared to a conventional aerosol distributor arrangement comprising interconnected perforated tubes and a baffle arrangement to achieve acceptable mixing. For example in a conventional air duct having a square cross section of 610×610 mm with an air flow rate of 3400 $m^3$/h, the pressure drop of an aerosol distributor according to the invention, having 784 (28×28) channels, each channel having a round cross section with a diameter of about 12 mm, is 35 Pa. This can be compared to a pressure drop of 130 Pa for a conventional state of the art aerosol distributor.

In some embodiments, the plurality of channels comprises in the range of 100-3000 channels per square meter of the overall cross sectional area of the housing in a plane orthogonal to the general flow direction of the gas stream. In preferred embodiments, the plurality of channels comprises in the range of 400-3000 or 500-3000 channels per square meter of the overall cross sectional area of the housing in a plane orthogonal to the general flow direction of the gas stream.

The channel inlets and channel outlets are preferably evenly distributed over the upstream surface and downstream surface of the housing, respectively. In some embodiments, the channels extend between the upstream surface and the downstream surface of the housing in the general flow direction of the gas stream, preferably parallel to the general flow direction of the gas stream. This way, the aerosol distributor also acts to equalize irregularities in the airflow and distribute the airflow more evenly over the surface area of the filter.

The channels may be provided in different shapes and sizes. In some embodiments, the channels have a round or square cross sectional geometry, whereas in other embodiments, the channels may have a multifaceted, e.g. hexagonal, cross sectional geometry, In some embodiments, the channels have an overall width or diameter in the range of 5-50 mm, preferably in the range of 8-20 mm, more preferably in the range of 10-15 mm. These ranges have been found to provide a particularly favorable combination of even aerosol distribution, even air/gas flow, and low pressure drop.

The number and size of the channels is preferably combined such that the total cross sectional area of the channels is at least 20%, preferably at least 30%, more preferably at least 40%, of the overall cross sectional area of the housing in a plane orthogonal to the general flow direction of the gas stream.

As an example, for a square duct of inside dimensions 610×610 mm the outer dimensions of the housing may also be about 610×610 mm or less with a depth in the air flow direction of about 10-50 mm, such that the housing fits in and substantially covers the cross section of the duct. This corresponds to an overall cross sectional area of the housing in a plane orthogonal to the general flow direction of the gas stream of 0.37 $m^2$. The housing may for example comprise 784 evenly distributed circular channels having an inner diameter of 12 mm. This corresponds to a total cross sectional area of the channels of about 0.089 $m^2$, or about 25% of the overall cross sectional area of the housing.

The aerosol distributor is preferably positioned with an upstream surface facing the incoming gas stream and a downstream surface facing the filter, and said outlet holes are positioned at an upstream surface of the plate like housing, either on an upstream surface, or inside the channels at a position closer to the upstream surface than to the downstream surface. In some embodiments, the outlet holes are positioned on an upstream surface of the housing, between said channels. In some embodiments, the outlet holes are positions inside the channels at a position closer to the upstream surface than to the downstream surface.

In the inventive aerosol distributor, the dimensions of the outlet holes are preferably selected such that during operation, the test aerosol flow velocity through the outlet holes is higher than the air flow velocity in the duct.

Preferably, both the channels and the outlet holes are evenly distributed across a cross-sectional area of the aerosol distributor, and accordingly evenly distributed across a cross-sectional area of the passing gas stream. This way, the aerosol can be evenly distributed into the gas stream. To further improve the uniformity of the aerosol distribution the number of outlet holes and/or the number of channels can be increased.

The inlet(s) may be positioned anywhere on the housing, but in order to minimize the disturbance on the airflow downstream of the aerosol distributor, the inlet(s) are preferably positioned on the upstream surface of the housing, between said channels. The inlet(s) are preferably positioned or distributed symmetrically in relation to the outlet holes such that the flow conditions between the inlet(s) and outlet holes are kept as similar as possible.

The aerosol distributor may be designed in various shapes and sizes. The shape of the aerosol distributor is preferably selected so as to correspond to the duct or filter cabinet in which it is to be fitted. As most ducts and cabinets have either a round or square cross sectional geometry, the hollow plate like housing is preferably round or square. The hollow plate like housing may typically have an overall width or diameter in the range of 100-1300 mm, preferably in the range of 250-650 mm. In some embodiments, the hollow plate like housing has a thickness in the range of 5-100 mm, preferably in the range of 10-50 mm.

The effect of the inventive aerosol distributor is believed to be especially pronounced because of the typically relatively low pressure of the aerosol that is fed to the aerosol distributor. The aerosol pressure from the aerosol source is typically in the range of 0.1-5 bar, preferably in the range of 0.2-3 bar. Thus, in some embodiments, the aerosol distributor further comprises an aerosol source adapted to feed a test aerosol to the inlet of the housing at a pressure in the range of 0.1-5 bar, preferably in the range of 0.2-3 bar.

According to a second aspect of the disclosure, there is provided an arrangement for filter leakage detection in a gas filtration system, comprising:

a filter housing for sealably mounting a filter within said housing such that an gas stream passing through the housing passes through the filter;

an aerosol distributor positioned in the gas stream upstream of the filter for releasing a test aerosol from an aerosol source into the gas stream, wherein the aerosol distributor comprises a hollow housing having at least one aerosol inlet for admitting an aerosol from an aerosol source into a chamber inside said housing; and a plurality of aerosol outlet holes for releasing the aerosol from the chamber into a gas stream surrounding the housing, wherein said housing has a plate like shape having an upstream surface configured to face an incoming gas stream and a downstream surface configured to face a filter, wherein said housing comprises a plurality of channels extending between channel inlets at the upstream surface and channel outlets at the downstream surface of the housing, such that gas from the gas stream can pass through the housing.

The aerosol distributor of the arrangement of the second aspect may be further defined as described above with reference to the first aspect of the disclosure.

The aerosol distributor is preferably positioned with an upstream surface facing the incoming gas stream and a downstream surface facing the filter, and said outlet holes are positioned at an upstream surface of the plate like housing, either on an upstream surface, or inside the channels at a position closer to the upstream surface than to the downstream surface.

The inventive aerosol distributor is mounted in the filter housing or duct upstream of the filter and sized such that gas passing through the filter housing or duct towards the filter must also pass through the channels of the aerosol distributor.

The shape of the aerosol distributor is preferably selected so as to correspond to the duct or filter cabinet in which it is to be fitted. As most ducts and cabinets have either a round or square cross sectional geometry, the hollow plate like housing is preferably round or square. The hollow plate like housing may typically have an overall width or diameter in the range of 100-1300 mm, preferably in the range of 250-650 mm. In some embodiments, the hollow plate like housing has a thickness in the range of 5-100 mm, preferably in the range of 10-50 mm.

The aerosol distributor may be placed at a conventional distance from the filter (typically about 400 mm) to provide improves aerosol distribution compared to a corresponding single chamber distributor, or it can be placed closer to the filter to provide the same or better aerosol distribution compared to a conventional aerosol distributor, but with reduced build depth. In some embodiments, the aerosol distributor is mounted such that the distance of said aerosol distributor from said filter is in the range of 50-400 mm, preferably in the range of 50-250 mm.

Downstream of the filter, an aerosol sampling probe is typically used to detect filter leakage. Thus, in some embodiments, a sampling probe is positioned in the gas stream downstream of the filter for sampling gas from the gas stream to be analyzed for the presence of test aerosol.

The sampling probe can be provided in many different forms and may be fixed or movable. Since it is desirable that the sampling probe does not noticeably interfere with the gas flow it cannot cover the whole area. Different concepts of sampling probes which are moved to scan the filter area have been developed. One kind thereof is an elongated sampling probe, which extends along the length or width of the filter and is moved back and forth perpendicularly of its longitudinal extension to scan the area in the vicinity of the filter surface. A typical elongated sampling probe is made of a tube with several inlet holes through the tube wall distributed along the length of the sampling probe, and a central outlet. This type of sampling probe allows detection of not only the existence of a leak, but can also give rough indication as to the position of the leak on the filter surface. Accordingly, in some embodiments, the sampling probe is movable in a plane parallel to the filter surface, such that the filter surface can be scanned using the sampling probe.

In some embodiments, the sampling probe instead comprises a series of discrete probes evenly distributed across a cross-sectional area of the filter housing, wherein each discrete probe can be analyzed independently. The series of discrete probes thereby allows detection of not only the existence of a leak, but can also give rough indication as to the position of the leak on the filter surface.

In some cases, especially with a movable sampling probe arranged to scan the filter surface, or a series of discrete probes, it is preferred that the sampling probe is placed close to the filter surface. In some embodiments, the distance of sampling probe from said filter is in the range of 5-100 mm, preferably in the range of 5-25 mm.

As the testing aerosol can eventually build up in the tested filter, it is typically desired to use as little aerosol as possible during testing. In some embodiments, the aerosol distributor can comprise an assembly of at least two aerosol distributor subunits, wherein each aerosol distributor subunit can be operated independently of the other aerosol distributor subunits. For example, instead of a single 610×610 mm aerosol distributor, an aerosol distributor comprised of four 305×305 mm aerosol distributor subunits is contemplated, wherein each aerosol distributor subunit can be operated independently of the other aerosol distributor subunits. An advantage of this configuration is that the total load aerosol to which the filter is subjected may be reduced when the downstream surface is filter is scanned using a movable sampling probe arranged to scan the filter surface, or a series of discrete fixed probes. Instead of subjecting the entire filter surface to aerosol during the entire test cycle, only the portion of the filter being scanned can be subjected to the aerosol.

As an alternative, a second plate like housing as defined above with reference to the first aspect of the disclosure could be used as a fixed sampling probe. For use as a sampling probe, the plate like housing is placed downstream of the filter, with the outlet holes facing the downstream surface of the filter. During testing, a portion of the gas stream is withdrawn from the duct through plate like housing and conveyed to an external instrument, such as a photometer or a particle counter or the like, which is used to determine the aerosol concentration. This configuration may be advantageous as it can be used to simultaneously withdraw samples from a large number of positions across a cross-sectional area of the passageway, while maintaining a low overall pressure drop.

Various embodiments of the invention will now be described more in detail with reference to the drawings.

BRIEF DESCRIPTION OF THE DRAWINGS

Referring now to the drawings, which are exemplary embodiments, and wherein:

FIGS. 6*a* and 6*b* show cross sectional views of an aerosol distributor according to the invention.

DETAILED DESCRIPTION OF PREFERRED EMBODIMENTS

Figure 1:
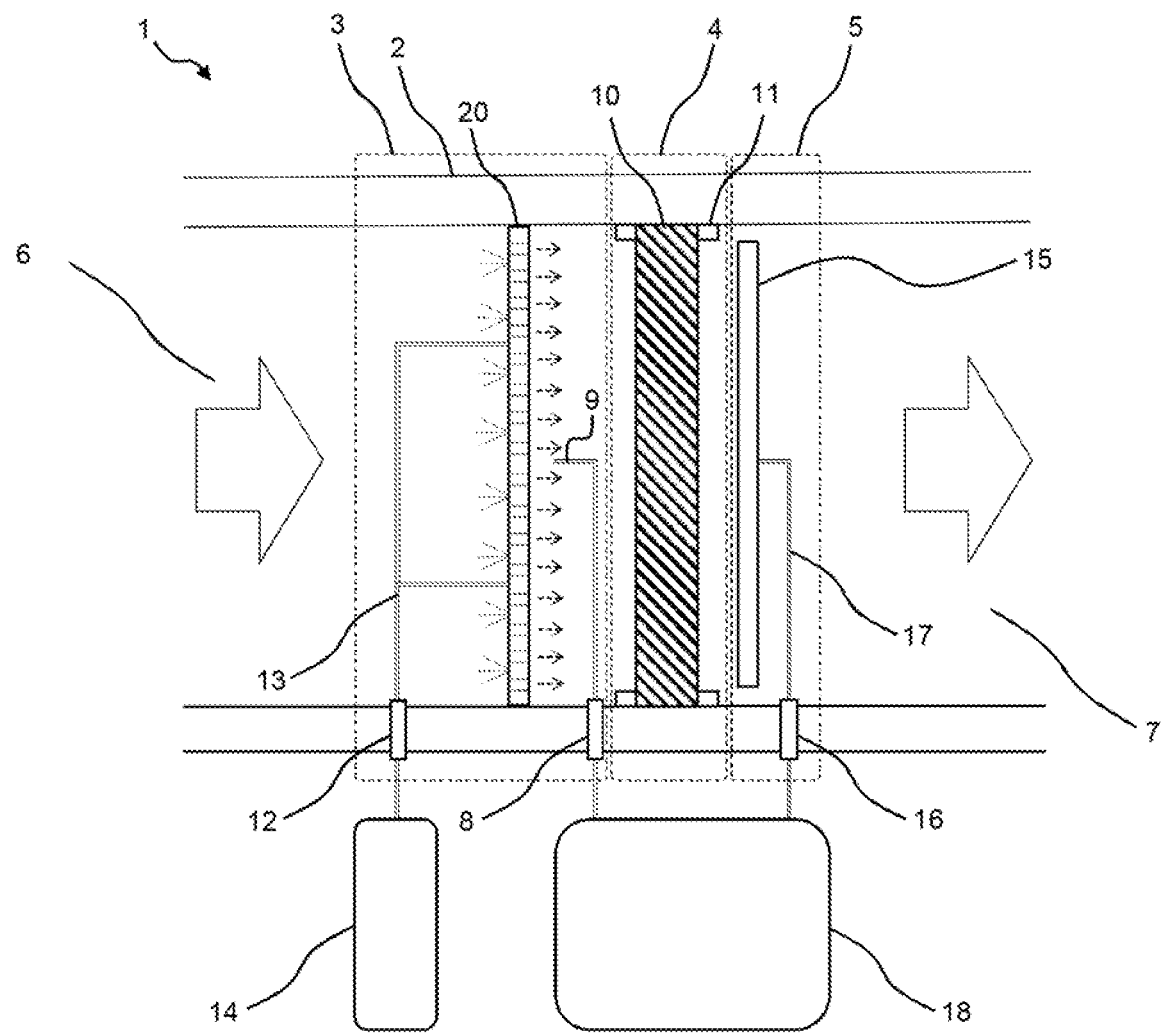
FIG. 1 is a schematic view of a gas filtration system having an arrangement for filter leakage detection.

FIG. 1 illustrates a gas filtration system, specifically an air filtration system, comprising an arrangement for filter leakage detection according to various embodiments. The air filtration system 1 includes a filter housing 2 having an upstream test section 3, a filter section 4, and a downstream test section 5 arranged in series. The air filtration system includes an airflow inlet aperture 6 at the upstream end and an airflow outlet aperture 7 at the downstream end.

The filter housing 2 can include one or more doors (not shown) that can be opened to permit access to filter 10 contained therein. The filter housing 2 also includes an upstream sample port 8 formed therethrough, and an upstream sampling probe 9 to allow samples of the aerosol concentration in the airflow upstream of the filters to be obtained during filter testing. The filter section 4 of the filter housing 2 includes a filter mounting 11 mechanism that is substantially aligned with the doors. The filter mounting mechanism 11 receives the filter 10 disposed in the filter section through the doors and can be actuated to sealingly retain the filter 10 in a position within the filter section 4 such that air entering the air filtration system 1 through the airflow inlet aperture 6 and exiting the airflow outlet aperture 7 must pass through and be filtered by the filter 10. The filter mounting mechanism 11 may be any suitable filter clamping mechanism utilized in commercially available gas filtration systems, or other suitable filter clamping system.

The upstream test section 3 is arranged between the airflow inlet aperture 6 and the filter section 4 and includes a duct forming a passageway directing the airflow from the airflow inlet aperture to the filter housing. An aerosol distributor 20 is arranged in the passageway. The aerosol distributor can be connected to and in fluid communication with an aerosol port 12 arranged through the duct body. One or more aerosol inlet(s) of the aerosol distributor 20 can be connected to the aerosol port 12 by a connecting tube 13. The connecting tube may include rigid or flexible tubing adapted to connect the aerosol distributor to the aerosol port. Aerosol from an aerosol source 14 can be introduced into the aerosol port 12 and travel through the connecting tube 13 into the aerosol distributor 20.

Figure 2A:
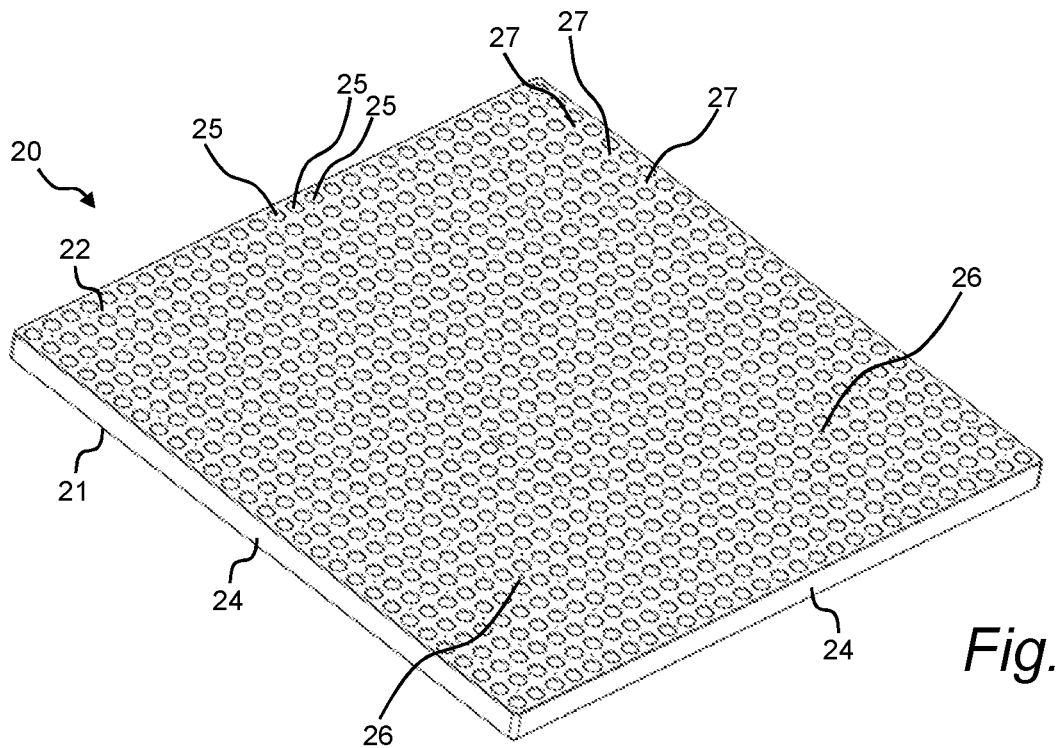
FIGS. 2*a* and 2*b* are perspective views of an aerosol distributor according to the invention.
Figure 2B:
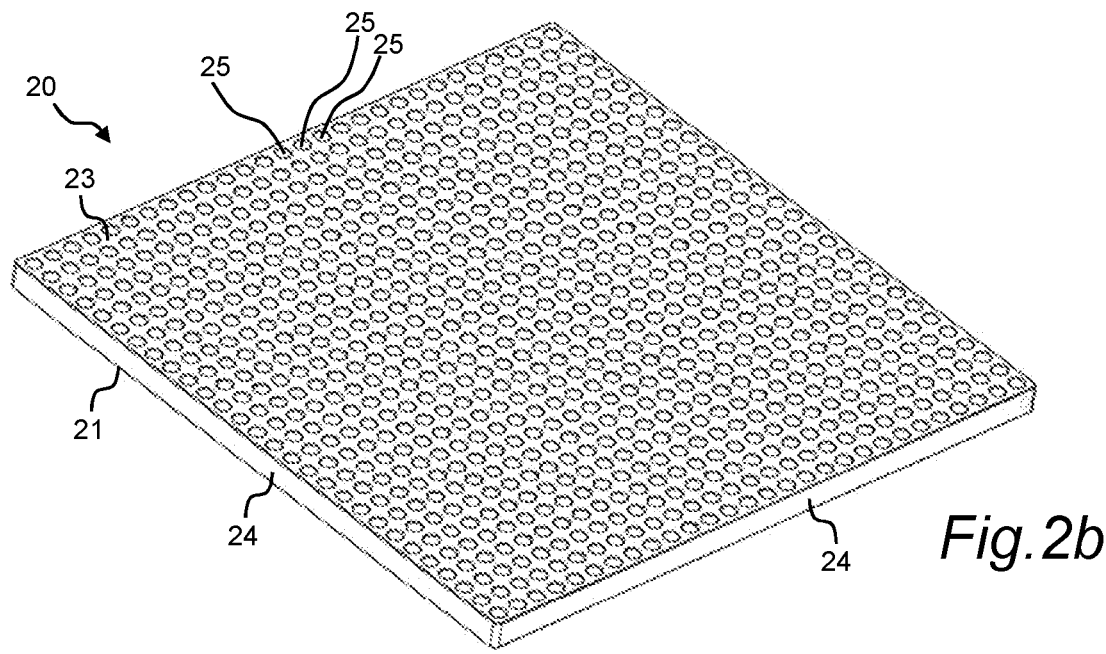
Figure 3A:
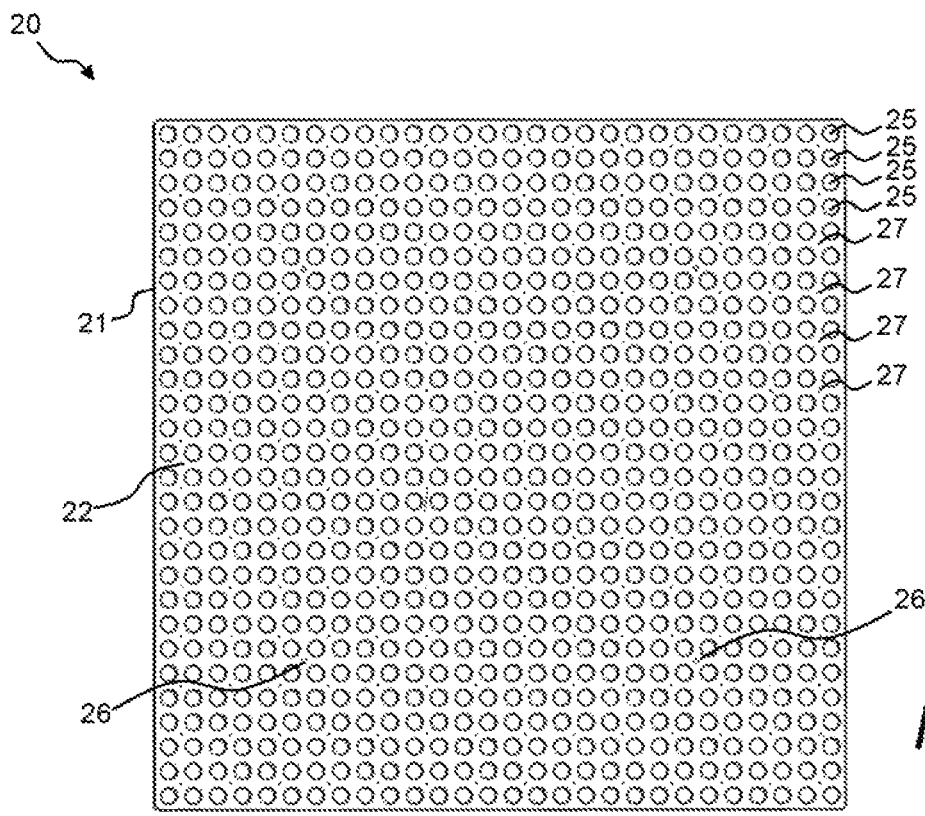
FIGS. 3*a* and 3*b* are views of the upstream surface of an aerosol distributor according to the invention.
Figure 3B:
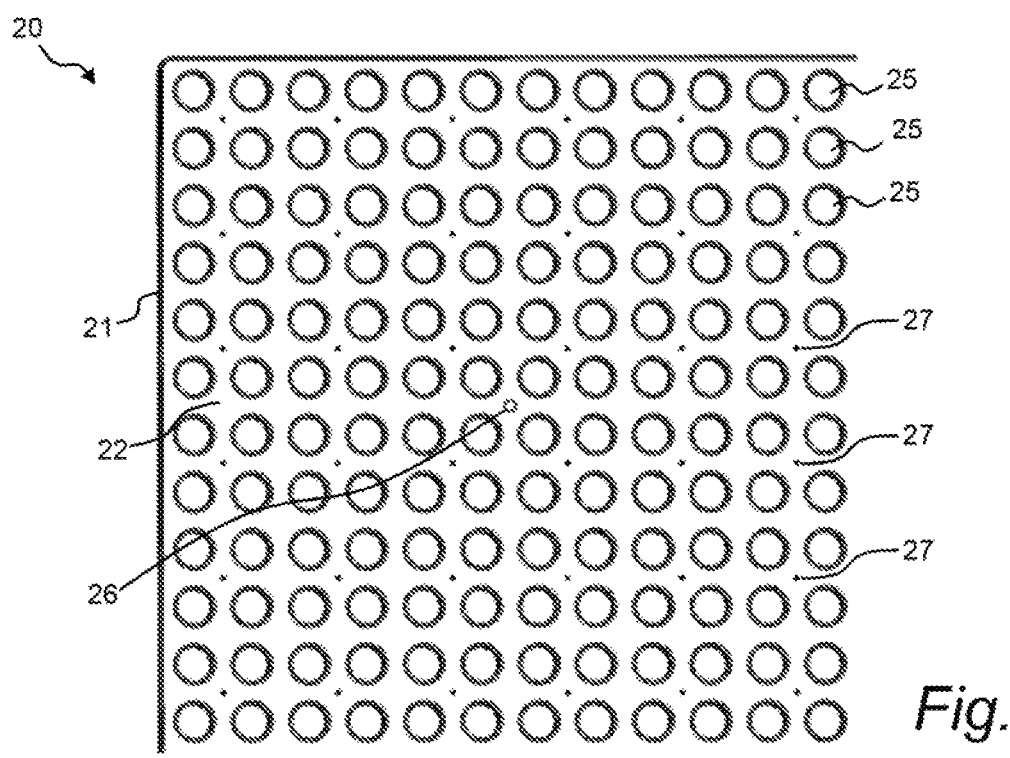
Figure 4A:
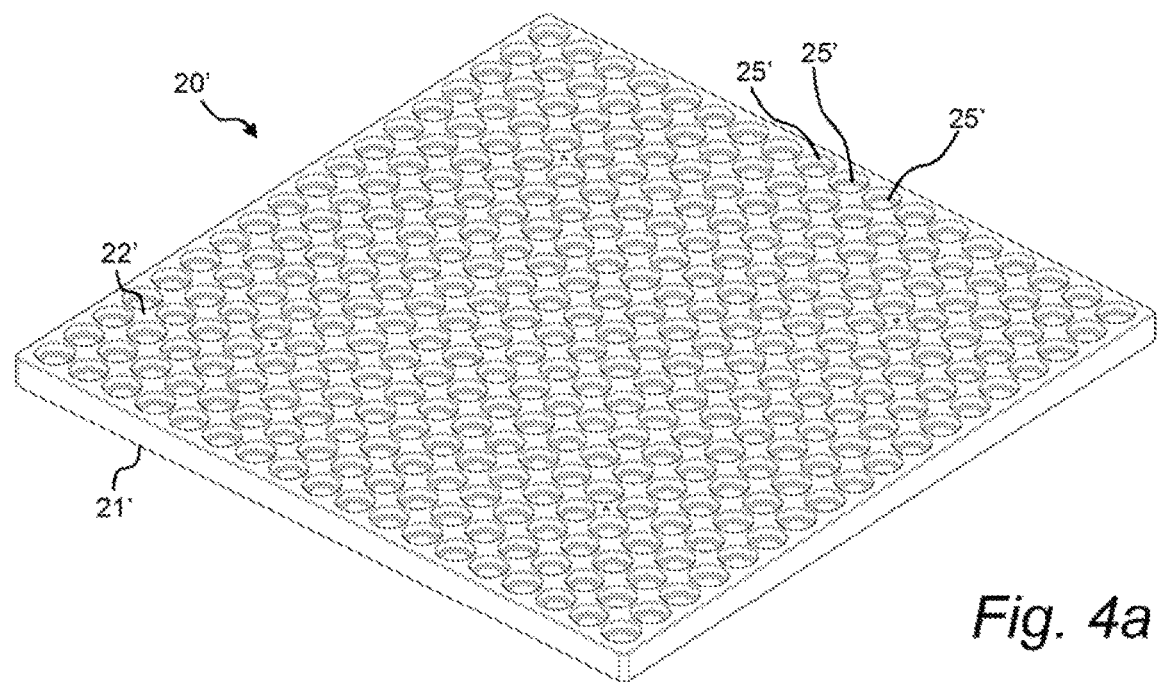
FIGS. 4*a* and 4*b* are perspective views of an aerosol distributor according to the invention.
Figure 4B:
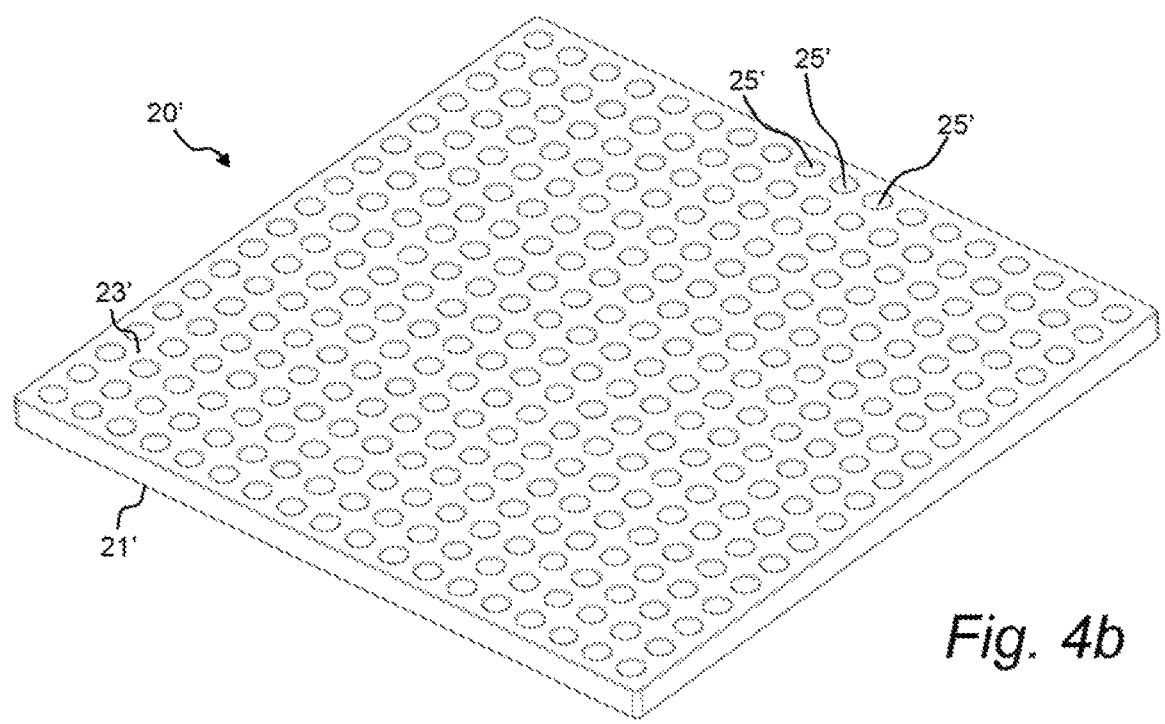
Figure 5A:
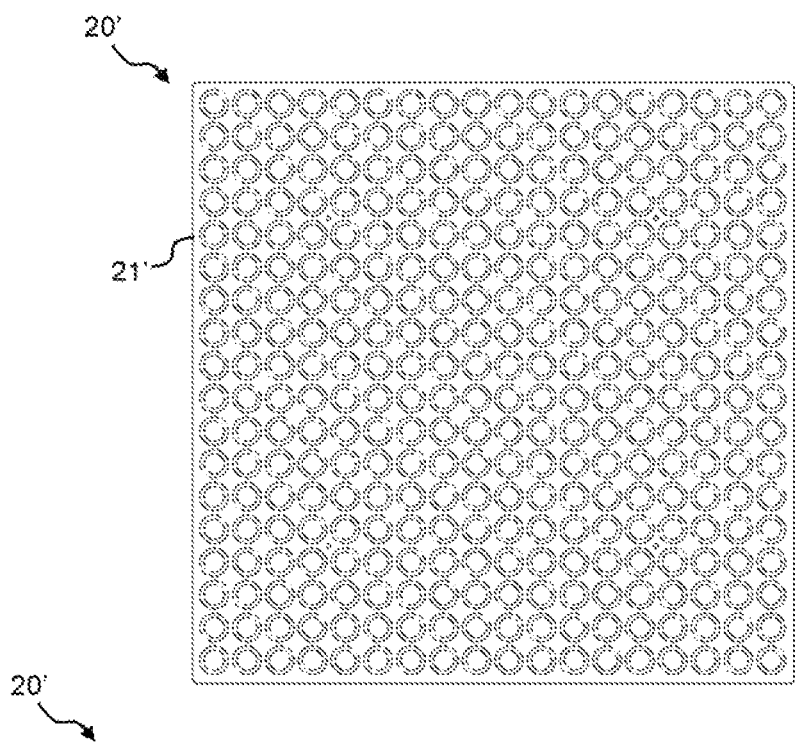
FIGS. 5*a* and 5*b* are views of the upstream surface of an aerosol distributor according to the invention.
Figure 5B:
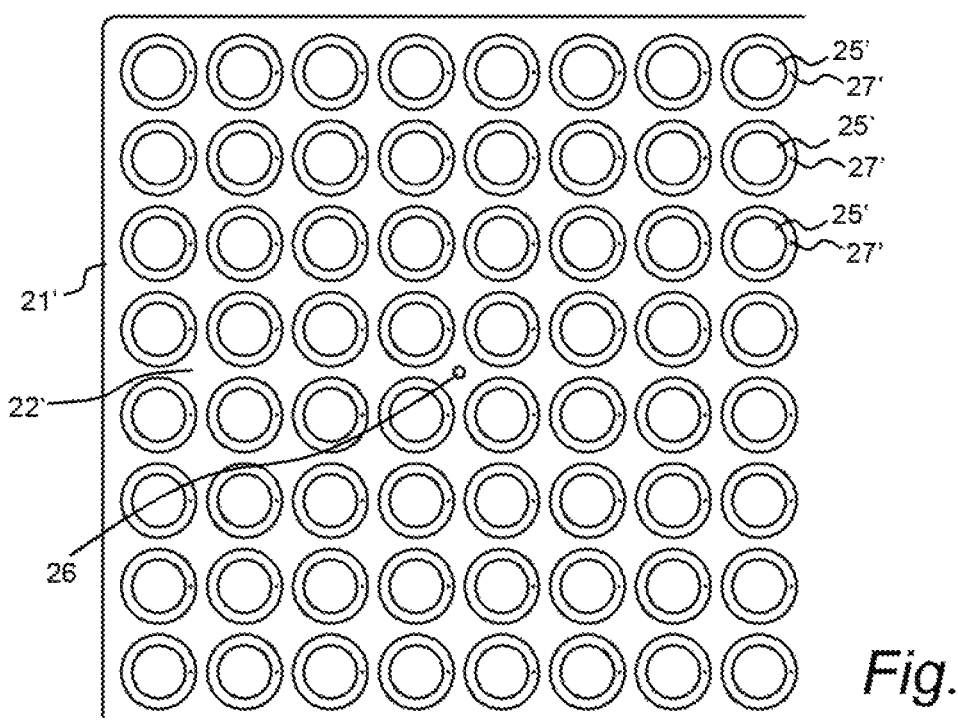

The basic constructional features of an embodiment of the aerosol distributor according to the present disclosure are illustrated in FIGS. 2*a*-2*b*.

The aerosol distributor 20 is comprised of a hollow plate like housing 21 defined by two main surfaces, namely an upstream surface 22 and a downstream surface 23, connected by edge surfaces 24 extending around the periphery of the main surfaces. The housing 21 further comprises a plurality of channels 25 extending between channel inlets at the upstream surface and channel outlets at the downstream surface of the housing, such that gas from the gas stream can pass through the housing 21.

Together, the main surfaces 22, 23, edge surfaces 24, and the plurality of channels 25 define a chamber inside the housing 21. The upstream surface 22 is configured to face an incoming gas stream and the downstream surface 23 is configured to face a filter.

The housing 21 is preferably made of plastic or metal. The housing may be assembled from two or more parts, e.g. a first part comprising the first main surface, the edge surfaces and the channels, and a second part comprising the second main surface, wherein the second part can be assembled with and fixed to the first part, e.g. by gluing. Suitable methods for manufacturing the housing or housing parts in plastic include 3D printing or molding. The inlet and outlet holes can for example be prepared by drilling.

The housing 21 has at least one aerosol inlet 26 for admitting an aerosol from an aerosol source via the aerosol port and connecting tube into the chamber inside of the housing, and a plurality of aerosol outlet holes 27 for releasing the aerosol from the chamber into the gas stream surrounding the housing.

The housing 21 of the aerosol distributor 20 is preferably designed such that when it is fitted in the passageway, the outlet holes 27 are evenly distributed across a cross-sectional area of the passageway. This way, the aerosol is evenly distributed into the airflow.

As an example, as shown in FIGS. 2a-3b, for a square duct of inside dimensions 610×610 mm the outer dimensions of the housing 21 may be about 610×610 mm or less with a depth in the air flow direction of about 10-50 mm, such that the housing 21 fits in and substantially covers the cross section of the duct. The housing 21 may for example comprise 784 (28×28) evenly distributed circular channels 25 having an inner diameter of 12 mm. The housing may further comprise 196 evenly distributed circular outlet holes 27 having an inner diameter of 1.6 mm, i.e. one outlet hole for every four channels. The housing may further include four circular inlets 26, i.e. one inlet for every 49 outlet holes. With an air flow rate of 3400 m$^3$/h, the pressure drop of this aerosol distributor is about 35 Pa. This can be compared to a pressure drop of about 130 Pa for a conventional state of the art aerosol distributor.

As another example, as shown in FIGS. 4a-6b, for a square duct of inside dimensions 610×610 mm the outer dimensions of the housing 21' of the aerosol distributor 20' may be about 610×610 mm or less with a depth in the air flow direction of about 10-50 mm, such that the housing fits in and substantially covers the cross section of the duct. The housing may for example comprise 324 (18×18) evenly distributed circular channels 25 having an inner diameter of 20 mm. The housing may further comprise 324 evenly distributed circular outlet holes 27 having an inner diameter of 1.6 mm, i.e. one outlet hole per channel. The housing may further include four circular inlets 26, i.e. one inlet for every 81 outlet holes.

The channels can have the same or different cross sectional geometry and size. The channels may also have a constant cross sectional geometry and size over the length of the channel, or across sectional geometry and size which varies over the length of the channel. For example, the channels can have one diameter at the channel inlet at the upstream surface of the housing, and a different diameter at the channel outlet at the downstream surface of the housing.

In FIGS. 2a-3b, the channels 25 have a constant cross sectional geometry and size over the length of the channel. In FIGS. 4a-6b, the channels 25' have a larger diameter at the channel inlet at the upstream surface 22' of the housing 21', and a smaller diameter at the channel outlet at the downstream surface 23' of the housing.

As shown in FIGS. 6a-6b, the main surfaces, edge surfaces, and the plurality of channels define a chamber inside 28 the housing. FIG. 6a is a cross section through the inlets 26, between two rows of channels. FIG. 6b is a cross section through a row of channels 25' showing the channel walls and the chamber 28 formed between the channels.

The shape of the aerosol distributor is preferably selected so as to correspond to the duct or filter cabinet in which it is to be fitted. As most ducts and cabinets have either a round or square cross sectional geometry, the hollow plate like housing is preferably round or square. The aerosol distributor shown in the figure is configured to be fitted in a square duct, and accordingly the housing is manufactured accordingly. The hollow plate like housing may typically have an overall width or diameter in the range of 100-1300 mm, preferably in the range of 250-650 mm.

It is understood that the aerosol distributor could also be manufactured in other shapes, to fit other duct profiles.

Via the aerosol port 12, the aerosol distributor 20 can be connected to an aerosol source 14 adapted to feed a test aerosol to the inlet of the housing 21 at a pressure in the range of 0.1-5 bar, preferably in the range of 0.2-3 bar.

The downstream test section 5 is arranged between the downstream surface of the filter 10 in the filter housing section 4 and the airflow outlet aperture 7 and includes a duct forming a passageway directing the airflow from the filter to the airflow outlet aperture 7. An aerosol sampling probe 15 is arranged in the passageway. The aerosol sampling probe 15 is positioned in the gas stream downstream of the filter for sampling gas from the gas stream to be analyzed for the presence of test aerosol. The sampling probe 15 can be connected to and in fluid communication with a sampling port 16 arranged through the duct body. During testing, a portion of the gas stream is withdrawn from the duct through the sampling probes and conveyed to an external instrument 18, such as a photometer or a particle counter, or the like, which is used to determine the aerosol concentration in both the upstream and downstream samples. The aerosol concentration measured in the samples collected through the sampling probes downstream may optionally be compared to an aerosol concentration measured in the samples collected through the upstream sampling probe 9.

The downstream sampling probe may be movable in a plane parallel to the filter surface, such that the filter surface can be scanned using the sampling probe. This type of sampling probe allows detection of not only the existence of a leak, but can also give rough indication as to the position of the leak on the filter surface.

A typical sampling probe is made of a tube with several inlet holes through the tube wall distributed along the length of the sampling probe, and a central outlet connected to the downstream sampling port. Different concepts for moving the probe to scan the filter surface have been developed. One concept uses an elongated sampling probe, which extends along the length or width of the filter and is movable back and forth in a direction perpendicular to its longitudinal extension by means of a manual or motor driven mechanism like a cylinder, a power screw or other suitable mechanism, to scan the area in the vicinity of the filter surface.

In some embodiments, the sampling probe instead comprises a series of fixed discrete probes evenly distributed across a cross-sectional area of the filter housing, wherein each discrete probe can be analyzed independently. The series of discrete probes thereby allows detection of not only the existence of a leak, but can also give rough indication as to the position of the leak on the filter surface.

In some cases, especially with a movable sampling probe arranged to scan the filter surface, or a series of discrete probes, it is preferred that the sampling probe is placed close to the filter surface. In some embodiments, the distance of sampling probe from said filter is in the range of 5-100 mm, preferably in the range of 5-25 mm.

As an alternative, a second plate like housing as defined above with reference to the first aspect of the disclosure could be used as a fixed sampling probe. For use as a sampling probe, the plate like housing is placed downstream of the filter, with the outlet holes facing either towards or away from the downstream surface of the filter. During testing, a portion of the gas stream is withdrawn from the duct through plate like housing and conveyed to an external instrument, such as a photometer or a particle counter or the like, which is used to determine the aerosol concentration. This configuration may be advantageous as it can be used to simultaneously withdraw samples from a large number of positions across a cross-sectional area of the passageway, while maintaining a low overall pressure drop.

The term total cross sectional area as used herein with reference to the channels or gas duct refers to the overall open cross sectional area of the channel or gas duct in a plane orthogonal to the general flow direction of the gas stream.

While the invention has been described herein with reference to various exemplary embodiments, it will be understood by those skilled in the art that various changes may be made and equivalents may be substituted for elements thereof without departing from the scope of the invention. In addition, many modifications may be made to adapt a particular situation or feature to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Furthermore, it would be understood by the person skilled in the art what features of the different embodiments can be combined although not explicitly written above.

The invention claimed is:

1. An aerosol distributor for filter leakage detection in a gas filtration system, said aerosol distributor being configured to be positioned in a gas stream upstream of a filter, said aerosol distributor comprising:
    a hollow housing having at least one aerosol inlet for admitting an aerosol from an aerosol source into a chamber inside said housing, and
    a plurality of aerosol outlet holes for releasing the aerosol from the chamber into a gas stream surrounding the housing, said housing has a plate like shape having an upstream surface configured to face an incoming gas stream and a downstream surface configured to face the filter, wherein said housing comprises a plurality of channels extending between channel inlets at the upstream surface and channel outlets at the downstream surface of the housing, such that gas from the gas stream can pass through the housing.

2. The aerosol distributor according to claim 1, wherein the plurality of channels comprises in the range of 100-3000 channels per square meter of the overall cross sectional area of the housing in a plane orthogonal to the general flow direction of the gas stream.

3. The aerosol distributor according to claim 1, wherein said channel inlets and said channel outlets are evenly distributed over the upstream surface and downstream surface of the housing, respectively.

4. The aerosol distributor according to claim 1, wherein said channels extend between the upstream surface and the downstream surface of the housing in the general flow direction of the gas stream, preferably parallel to the general flow direction of the gas stream.

5. The aerosol distributor according to claim 1, wherein said channels have a round or square cross sectional geometry.

6. The aerosol distributor according to claim 1, wherein said channels have an overall width or diameter in the range of 5-50 mm, preferably in the range of 8-20 mm, more preferably in the range of 10-15 mm.

7. The aerosol distributor according to claim 1, wherein the total cross sectional area of the channels is at least 20%, preferably at least 30%, more preferably at least 40%, of the overall cross sectional area of the housing in a plane orthogonal to the general flow direction of the gas stream.

8. The aerosol distributor according to claim 1, wherein said outlet holes are positioned on an upstream surface of the housing, preferably between said channels.

9. The aerosol distributor according to claim 1, wherein said inlet(s) are positioned on the upstream surface of the housing, between said channels.

10. The aerosol distributor according to claim 1, wherein said hollow housing has a thickness in the range of 5-100 mm, preferably in the range of 10-50 mm.

11. The aerosol distributor according to claim 1, wherein said hollow housing is round or square.

12. The aerosol distributor according to claim 1, wherein the aerosol distributor is comprised of an assembly of aerosol distributor subunits, wherein each aerosol distributor subunit is an aerosol distributor as defined in claim 1.

13. The aerosol distributor according to claim 1, wherein said hollow housing has an overall width or diameter in the range of 100-1300 mm, preferably in the range of 250-650 mm.

14. An arrangement for filter leakage detection in a gas filtration system, comprising:
    a filter housing for sealably mounting a filter within said housing such that an gas stream passing through the housing passes through the filter, and
    an aerosol distributor positioned in the gas stream upstream of the filter for releasing a test aerosol from an aerosol source into the gas stream, wherein the aerosol distributor is as defined in claim 1.

15. The filter testing system according to claim 14, wherein the aerosol distributor is positioned with an upstream surface facing the incoming gas stream and a downstream surface facing the filter, and said outlet holes are positioned at an upstream surface of the plate like housing, either on an upstream surface, or inside the channels at a position closer to the upstream surface than to the downstream surface.

16. The filter testing system according to claim 15, wherein a distance of said aerosol distributor from said filter is in the range of 50-400 mm, preferably in the range of 50-250 mm.

17. The filter testing system according to claim 16, further comprising:
    a sampling probe positioned in the gas stream downstream of the filter for sampling gas from the gas stream to be analyzed for the presence of test aerosol.

18. The filter testing system according to claim 17, wherein the sampling probe is movable in a plane parallel to the filter surface, such that the filter surface can be scanned using the sampling probe.

19. The filter testing system according to claim 18, wherein a distance of sampling probe from said filter is in the range of 5-50 mm, preferably in the range of 5-25 mm.

* * * * *